U S 0 0 9 1 3 2 8 1 2 B 2

US009132812B2

(12) United States Patent
Treppenhauer et al.

(10) Patent No.: US 9,132,812 B2
(45) Date of Patent: Sep. 15, 2015

(54) RETAINING FUNCTION FOR A MOTOR VEHICLE

(75) Inventors: Patrick Treppenhauer, Hofheim (DE); Erik Hartmanshenn, Großkrotzenburg (DE); Alexander Mann-Wahrenberg, Bischofsheim (DE)

(73) Assignee: Continental Teves AG & Co. oHG (DE)

( * ) Notice: Subject to any disclaimer, the term of this patent is extended or adjusted under 35 U.S.C. 154(b) by 205 days.

(21) Appl. No.: 13/825,220

(22) PCT Filed: Sep. 22, 2011

(86) PCT No.: PCT/EP2011/066481
§ 371 (c)(1),
(2), (4) Date: Mar. 20, 2013

(87) PCT Pub. No.: WO2012/038498
PCT Pub. Date: Mar. 29, 2012

(65) Prior Publication Data
US 2013/0184954 A1    Jul. 18, 2013

(30) Foreign Application Priority Data
Sep. 23, 2010    (DE) .................. 10 2010 041 268

(51) Int. Cl.
*B60T 13/66*    (2006.01)
*B60T 7/12*    (2006.01)
(Continued)

(52) U.S. Cl.
CPC . *B60T 7/12* (2013.01); *B60T 7/122* (2013.01); *B60T 8/32* (2013.01); *B60T 8/4872* (2013.01); *B60T 13/662* (2013.01); *B60T 13/686* (2013.01); *B60T 2201/06* (2013.01)

(58) Field of Classification Search
CPC ............. B60T 7/12; B60T 7/122; B60T 8/32; B60T 8/4872; B60T 13/662; B60T 13/686; B60T 2201/06
USPC ......... 701/70; 188/158, 342, 72.7; 340/425.5, 340/457.3; 303/17, 20, 22.1, 9.76; 702/42; 92/31
See application file for complete search history.

(56) References Cited

U.S. PATENT DOCUMENTS

| 6,019,436 | A | 2/2000 | Siepker |
| 6,802,574 | B2 * | 10/2004 | Ehrmaier et al. ............... 303/16 |
| 7,401,872 | B2 | 7/2008 | Kinder et al. |

(Continued)

FOREIGN PATENT DOCUMENTS

| DE | 100 63 063 | 6/2002 |
| DE | 101 04 498 | 8/2002 |

(Continued)

OTHER PUBLICATIONS

English translation of Chinese Office Action corresponding to application No. CN 2011800460936, dated Aug. 11, 2014.
(Continued)

*Primary Examiner* — Adam Tissot
(74) *Attorney, Agent, or Firm* — RatnerPrestia

(57) ABSTRACT

A method and a brake system, in which method a vehicle having a service brake and a parking brake is held by autonomous brake actuation, wherein in a first step, an actuation of the service brake is performed, and in the event of a predefined condition being met, a transfer from the service brake to the parking brake takes place. According to an aspect of the invention, during the transfer, both an actuation of the parking brake and also an additional actuation of the service brake takes place.

15 Claims, 2 Drawing Sheets

(51) Int. Cl.
*B60T 8/32* (2006.01)
*B60T 8/48* (2006.01)
*B60T 13/68* (2006.01)

(56) References Cited

U.S. PATENT DOCUMENTS

| | | | |
|---|---|---|---|
| 8,322,473 | B2 | 12/2012 | Hilberer |
| 2006/0186731 | A1 | 8/2006 | Bach |
| 2008/0018171 | A1 | 1/2008 | Ohlig et al. |
| 2010/0211281 | A1* | 8/2010 | Baier-Welt et al. ............ 701/70 |

FOREIGN PATENT DOCUMENTS

| | | |
|---|---|---|
| DE | 102 13 346 | 9/2003 |
| DE | 103 45 485 | 4/2005 |
| DE | 10 2005 042 282 | 3/2007 |
| DE | 10 2007 030 780 | 1/2009 |
| DE | 10 2009 004 023 | 8/2010 |
| EP | 0 825 081 | 2/1998 |
| WO | WO 2005/042320 | 5/2005 |
| WO | WO 2008/115132 | 9/2008 |

OTHER PUBLICATIONS

International Search Report corresponding to application PCT/EP2011/066481, dated Jan. 18, 2012.

German Search Report corresponding to application DE 10 2011 083 171.1, dated Jul. 16, 2012.

* cited by examiner

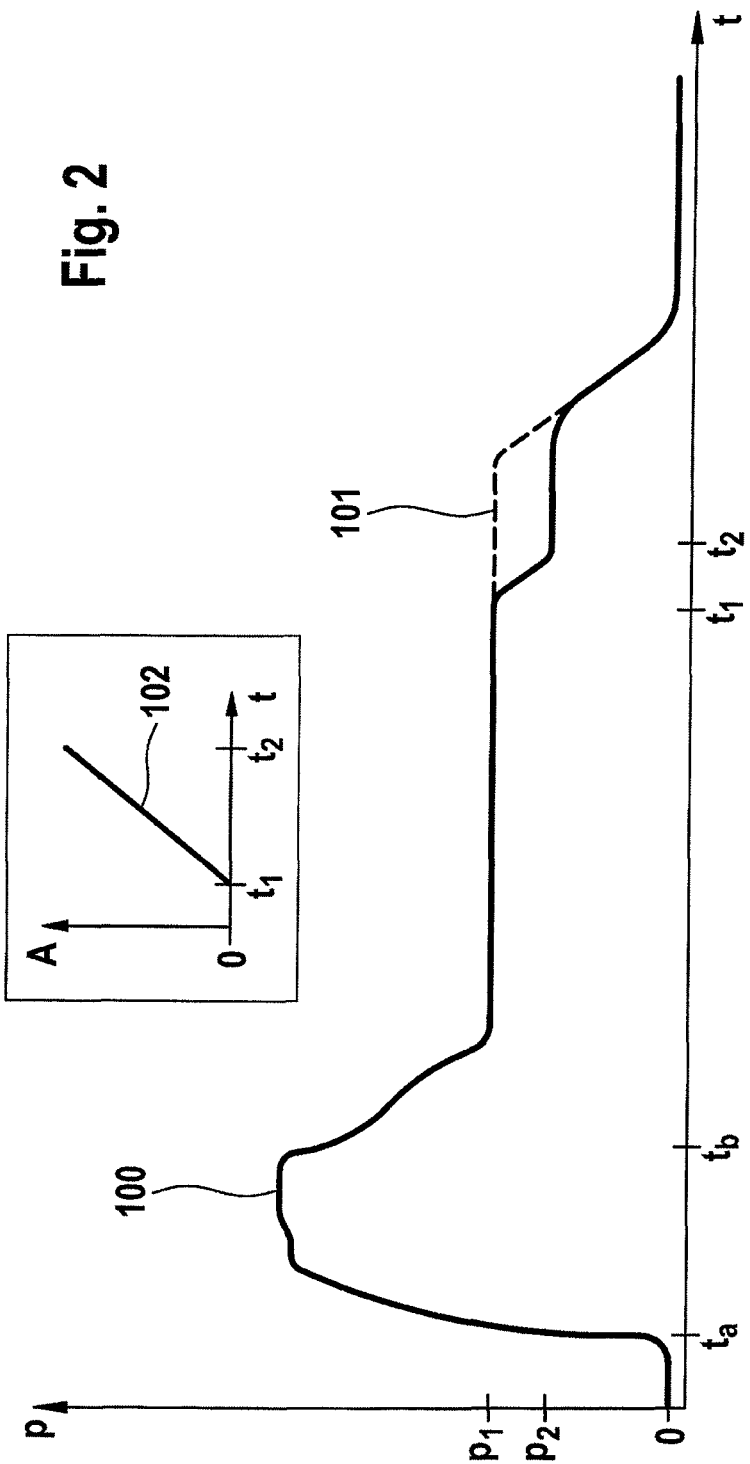

RETAINING FUNCTION FOR A MOTOR VEHICLE

CROSS REFERENCE TO RELATED APPLICATIONS

This application is the U.S. National Phase Application of PCT International Application No. PCT/EP2011/066481, filed Sep. 22, 2011, which claims priority to German Patent Application No. 10 2010 041 268.6, filed Sep. 23, 2010, the contents of such applications being incorporated by reference herein.

FIELD OF THE INVENTION

The invention relates to a method for a vehicle having a service brake and a parking brake held by autonomous brake actuation and to a brake system according to having a service brake which permits a driver-independent brake actuation and having an electrically actuable parking brake.

BACKGROUND OF THE INVENTION

Motor vehicles are generally equipped with a hydraulic service brake system in which pressure is built up in a master brake cylinder, and is transmitted to wheel brakes via brake lines filled with a hydraulic medium, in accordance with a brake pedal actuation by the driver. It is often also possible for an autonomous pressure build-up to be performed according to demand, and independently of a brake pedal actuation, by an electronic control unit. Driving safety functions such as driving dynamics regulation (Electronic Stability Control, ESC), and increasingly also assistance functions such as a holding function of the vehicle (Active Vehicle Hold, AVH), are provided by means of a driver-independent brake actuation of said type. Said holding function can, by means of an autonomous pressure build-up and a shutting-in of brake pressure in the wheel brakes, automatically hold the vehicle at a standstill on a gradient even over a relatively long period of time. If the vehicle is equipped with an electrically actuable parking brake system, a transfer from the service brake system to the parking brake system takes place under certain conditions (for example if the driver opens the door).

DE 103 45 485 A1, which is incorporated by reference, discloses a brake device having a service brake and parking brake function, which brake device comprises a hydraulic pressure-generating unit for the hydraulic application of the brake device, a self-locking, preferably electric force generating unit for additional application of the brake device, and a brake-application element which is acted on both by the hydraulic pressure generating device and also the additional force generating device. In the case of an actuation of the parking brake function, the additional brake application takes effect after the hydraulic brake application. The level of the brake-application force of the additional brake application is higher than the level of the brake-application force of the hydraulic brake application. An electric parking brake which acts jointly with a hydraulic service brake on a brake-application device provided with friction lining is known under the name "integrated parking brake" (IPB).

EP 1 678 018 B1, which is incorporated by reference, discloses a method for stabilizing a motor vehicle which is braked at a standstill, which motor vehicle is equipped with a brake system which can be actuated independently of the driver and which comprises a service brake and a parking brake. After the vehicle comes to a standstill, a parking brake force which is to be generated by the parking brake for maintaining the vehicle standstill state is determined, and a service braking force which simulates the parking brake is generated independently of the driver by means of the service brake, whereupon the predetermined parking braking force is built up by means of the parking brake and, when or after the parking braking force is attained in the parking brake, the service brake is deactivated. This method is intended to prevent the vehicle from rolling away, which may occur in the case of a partially icy roadway as a result of the parking brake being provided for example only on the rear wheels, whereas the service brake acts on all of the wheels of the vehicle.

It is often the case that vehicles are equipped only with a hydraulic service brake at least one wheel, in particular at the front wheels, and with an integrated parking brake at least one wheel, in particular at the rear wheels. When a transfer from the hydraulic holding function of the service brake to the electric parking brake takes place in a vehicle equipped in this way, a retroaction of the parking brake on the hydraulic brake can lead to an undesired slow release of the brake pads and to slippage of the brake disk, with a disturbing noise being generated.

SUMMARY OF THE INVENTION

It is therefore an aspect of the present invention to specify a method for holding a vehicle, which method ensures a longer-lasting standstill state of the vehicle without the comfort of the driver being reduced by disturbing noises and/or a movement of the vehicle.

Said aspect is achieved by means of the method for a vehicle having a service brake and a parking brake held by autonomous brake actuation, wherein in a first step, an actuation of the service brake is performed, and in the event of a predefined condition being met, a transfer from the service brake to the parking brake takes place, wherein during the transfer, both an actuation of the parking brake and also an additional actuation of the service brake take place and the brake system having a service brake which permits a driver-independent brake actuation and having an electrically actuable parking brake, wherein said brake system has a control unit for carrying out a method in which a vehicle having a service brake and a parking brake is held by autonomous brake actuation, wherein in a first step, an actuation of the service brake is performed, and in the event of a predefined condition being met, a transfer from the service brake to the parking brake takes place, wherein during the transfer, both an actuation of the parking brake and also an additional actuation of the service brake take place.

A method is thus provided in which a vehicle having a service brake and a parking brake is held by autonomous brake actuation, wherein in a first step, an actuation of the service brake is performed, and in the event of a predefined condition being met, a transfer from the service brake to the parking brake takes place. According to the invention, during the transfer, both an actuation of the parking brake and also an additional actuation of the service brake take place.

Here, an autonomous actuation of a brake is to be understood to mean that the build-up of braking force is demanded by a control unit and/or an assistance or driving safety function, with an actuation of the brake pedal by the driver not being necessary. The transfer from the service brake to the parking brake is to be understood to mean a process before the execution of which a braking force was built up by means of the service brake, during which an actuation of the service brake and/or parking brake takes place, and after which a braking force will be built up by means of the parking brake.

Here, during the transfer means that the stated feature applies at least temporarily during the course of the transfer.

By virtue of the fact that both an actuation of the parking brake and also an additional actuation of the service brake take place during the transfer, a retroaction of the parking brake on the service brake is avoided. There is thus always a sufficient braking force available to hold all of the wheels of the vehicle securely at a standstill without "settling" of the vehicle taking place or a disturbing noise being generated. The driver can thus comfortably leave the holding function activated for any desired length of time.

It is advantageous if the additional actuation of the service brake, in particular a further autonomous pressure build-up, takes place at least partially at the same time as the actuation of the parking brake. The simultaneous actuation of the service brake and parking brake is particularly suitable for compensating fast fluctuations in braking force.

The duration and intensity of the additional actuation of the service brake preferably has a predefined profile with respect to time, which is in particular set in accordance with a mathematical function or a predefined value table. The required additional braking force may be predetermined on the basis of the structural design of the brake system or with the aid of measurements on a test vehicle. It is thus possible for an optimum profile of the brake actuation to be selected in order to comfortably ensure the holding function. Said profile may be set by the control unit, on the basis of predefined mathematical functions with suitably selected parameters or—with increased storage space requirement, but in a more flexible manner—on the basis of a predefined value table (preferably stored in the control unit), through corresponding actuation of the service brake.

The additional actuation of the service brake particularly preferably encompasses at least one time period in which the braking force increases at a constant rate. Said constant increase of the braking force may be set for example in a hydraulic brake system by means of operation of a hydraulic pump at a constant rotational speed or constant volume flow rate. It is thereby possible with little outlay to at least approximate to a desired actuation profile of the service brake.

The additional actuation of the service brake very particularly preferably takes place such that, in a first time period, the braking force increases at a first rate, and in a second time period, the braking force increases at a second rate. It is thus possible, still with low outlay, to attain an improved—and in many cases adequate—approximation to the optimum actuation profile.

In particular, at least one rate is selected as a function of the speed of actuation of the parking brake and/or as a function of the braking force acting before the transfer. Said parameters influence the optimum actuation profile with regard to rate of change and/or intensity of the actuation and can be easily determined (for example on the basis of the design of the parking brake and the voltage applied to the motor and/or by means of a measurement of the hydraulic pressure of the service brake).

The additional actuation of the braking force is expediently performed such that, during the transfer from the service brake to the parking brake, the total braking force is held constant within a predefined degree of accuracy. This may be realized by means of control of the additional actuation of the service brake in accordance with a predefined profile or, in the presence of suitable sensors, by means of regulation. By virtue of the fact that the total braking force is kept practically constant, secure holding of the vehicle without disturbing noises is ensured.

In one preferred embodiment of the invention, during the transfer from the service brake to the parking brake, a check is performed as to whether the vehicle and/or one or more or all of the wheels remain at a standstill. This increases the reliability of the holding function.

In one particularly preferred embodiment of the invention, the standstill check takes place with the aid of at least one wheel rotational speed sensor, in particular at a wheel braked only by the service brake, wherein in particular the additional actuation of the service brake takes place when at least one signal flank of a wheel rotational speed sensor is detected, and is omitted when no signal flank of a wheel rotational speed sensor is detected. Wheel rotational speed sensors are provided in virtually all modern vehicles, and during the course of a revolution of the wheel, provide a plurality of pulse-like signals, the signal flanks of which can be detected by means of fast, low-complexity electronic circuits. By virtue of the additional actuation of the service brake taking place only when the pressure decrease actually leads to "settling" of the vehicle (which can be detected on the basis of a single signal flank), comfort is further increased and energy consumption is reduced.

It is preferable for a check as to whether the vehicle remains at a standstill to take place after the transfer from the service brake to the parking brake. It is particularly preferable for a check regarding the standstill state of the vehicle to take place with the aid of at least one wheel rotational speed sensor and/or at least one acceleration sensor and/or at least one yaw rate sensor. It would thus also be possible to detect if for example a rear wheel is slipping on ice or mud.

It is advantageous for the predefined condition for the transfer from the actuation of the service brake to the actuation of the parking brake to be met if a deactivation of the engine ignition and/or a release of at least one safety belt and/or an opening of at least one door and/or an expiry of a predefined time period is detected. If it can be assumed that onward travel is being deferred, the transfer to the electric parking brake is expedient.

The braking force of the service brake and/or of the parking brake is expediently selected as a function of a vehicle inclination and/or a loading state. By virtue of the hydraulic pressure of the holding function being selected to be only as high as is required in the present situation, the release upon commencement of onward travel can also take place more quickly.

The invention relates furthermore to a brake system for a vehicle, having a service brake which permits a driver-independent brake actuation and having an electrically actuable parking brake, which brake system has a control unit for carrying out a method as claimed in at least one of the preceding claims.

It is preferable if the parking brake and service brake at least one wheel of the vehicle act on the same brake-application element(s), which is/are assigned to a wheel, of wheel brakes. The wheel brakes may for example be in the form of disk brakes in which a brake-application element (the wheel brake cylinder or the brake pad) fastened to the vehicle acts on a brake disk connected to the wheel.

The service brake preferably has at least one hydraulic brake circuit which comprises hydraulically actuated friction brakes at least two wheels of the vehicle and in which at least one wheel of the vehicle can be braked only by the service brake.

It is particularly preferable if, during the transfer from the service brake to the parking brake, an autonomous pressure build-up takes place in at least one hydraulic brake circuit of the service brake, said autonomous pressure build-up in particular being controlled and/or regulated such that the pressure in the at least one hydraulic brake circuit is held constant within a predefined degree of accuracy. By virtue of the fact that the pressure drop in the brake circuit that occurs owing to a retroaction of the parking brake on the service brake is compensated with the aid of a simultaneous actuation of a hydraulic pump, for example, increased comfort of the holding function is realized.

BRIEF DESCRIPTION OF THE DRAWINGS

The invention is best understood from the following detailed description when read in connection with the accompanying drawings. Included in the drawings is the following figures:

FIG. 2 shows a diagram of the profile with respect to time of the brake pressure of the hydraulic brake system.

DETAILED DESCRIPTION OF THE PREFERRED EMBODIMENTS

Figure 1:
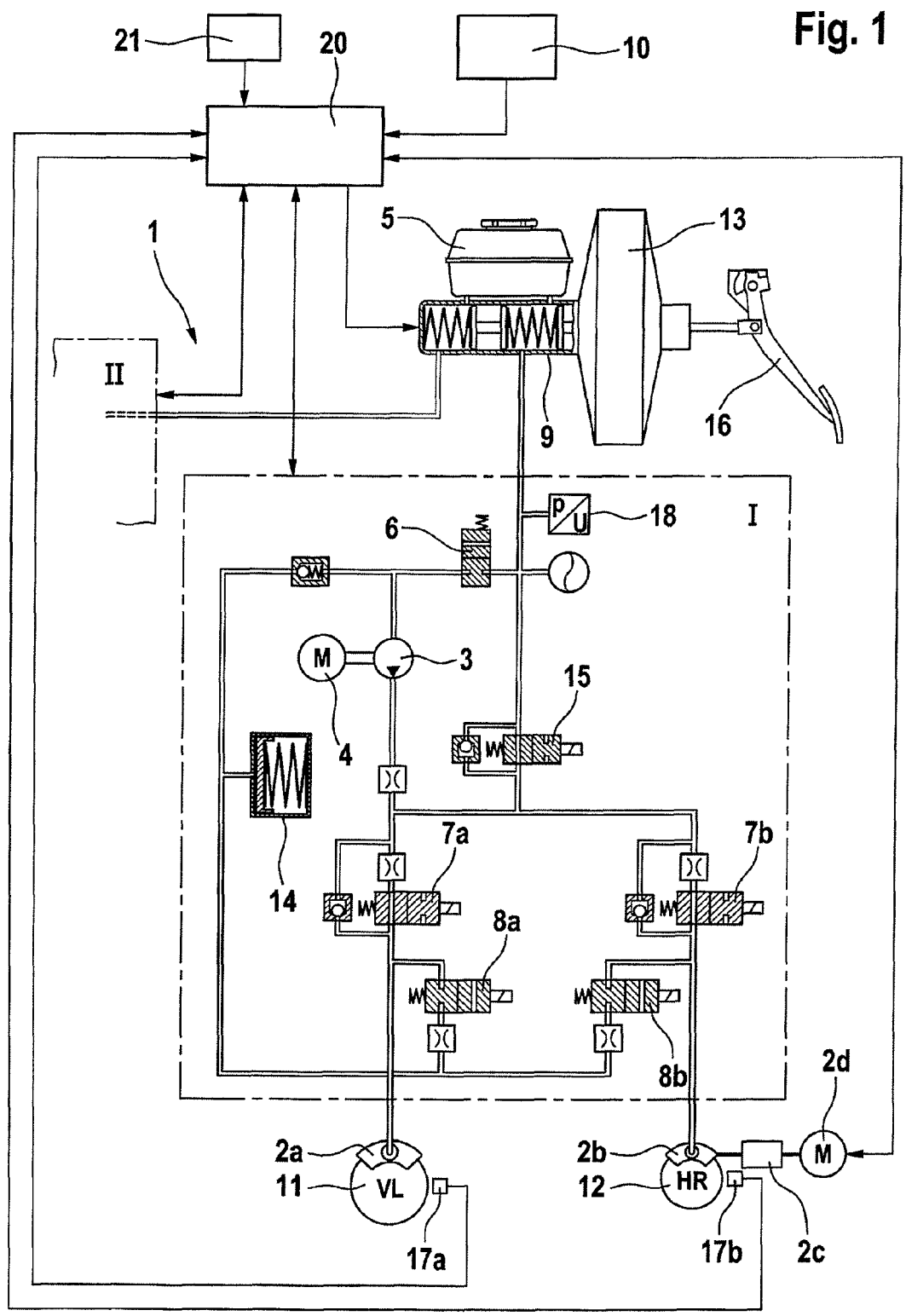
FIG. 1 is a schematic illustration of a brake system.

FIG. 1 shows a brake system 1 of a motor vehicle, having a control unit 20 to which are supplied sensor data from an ESC sensor arrangement 21, which comprises at least a yaw rate sensor and a lateral acceleration sensor, pulse-like signals from wheel rotational speed sensors 17a, 17b, and state signals of a switch 10. The control unit provides driving dynamics regulation and one or more further functions, wherein a holding function can be activated or deactivated by the driver of the motor vehicle by means of a switch 10.

The control unit 20 controls a brake system 1 which comprises two hydraulic brake circuits of a service brake, wherein FIG. 1 shows only a brake circuit I, which is connected to a brake cylinder (tandem master brake cylinder) 9, for a front left wheel 11 and a rear right wheel 12; a second brake circuit II is of corresponding construction, is likewise connected to the brake cylinder 9 and is illustrated merely indicatively. Wheel brakes of the wheels 11 and 12, having in each case one brake caliper 2a and 2b, are connected to the brake circuit I via in each case one hydraulic line, wherein the rear wheels 12 are equipped with an integrated parking brake which comprises a parking brake with a brake actuator 2c which can be actuated by direct-current motor 2d independently of a hydraulic pressurization.

The parking brake is also connected to control unit 20, which actuates direct-current motor 2d. The rotational movement of the direct-current motor 2d is converted into a linear movement of a brake piston of the brake actuator 2c by means of a gearing, such that the torque of the direct-current motor 2d acts, as a brake-application force F, on the brake caliper 2b via the brake piston. After the motor current I is shut off, the generated brake-application force F is maintained owing to self-locking of the gearing.

The brake-application force F itself is not measured. During the application of the parking brake, the direct-current motor 2d is driven in the direction of brake application, that is to say for example by the control unit 20 with a positive applied voltage, via an H-bridge circuit until a preset, defined setpoint value of the motor current is reached or exceeded. Then, the brake-application force assigned to the corresponding current value has been reached, and the direct-current motor 2d is shut off.

The brake system 1 has a brake force booster 13 connected to the brake cylinder 9 and has a storage vessel 5 for the brake fluid or the hydraulic fluid. The brake cylinder 9 generates, at the outlet side, a brake pressure corresponding to a brake pedal 16 which is connected to the brake force booster 13 and which is actuated by a driver. Said brake pressure is supplied via an open cut-off valve 15 to the inlet side in each case of a respective open inlet valve 7a and 7b, in order that a corresponding hydraulic brake pressure can build up at the wheels 11 and 12 by means of the brake calipers 2a and 2b. The two inlet valves 7a and 7b are open when deenergized. The brake force booster 13 with the brake cylinder 9 is connected to the control unit 20, which in addition thereto also receives signals of a pressure sensor 18 by means of which the hydraulic pressure in the brake cylinder 9 can be measured.

The brake calipers 2a and 2b are connected via a respective outlet valve 8a and 8b which is closed when deenergized to a low-pressure accumulator 14, which in turn is connected to the suction side of a hydraulic pump 3 and can be connected via a switching valve 6 to the master brake cylinder 9. Said hydraulic pump 3 is provided for the brake calipers 2a and 2b in order, in the case of a brake pressure dissipation for example as a result of brake slip regulation, to convey the brake medium, which during a pressure dissipation has been displaced into the low-pressure accumulator 14, out of the latter again. Furthermore, hydraulic pump 3 permits an autonomous pressure build-up for example during driving dynamics regulation. During an application of the electric parking brake at the rear wheels 12, an additional hydraulic brake pressure may also be built up, to which the brake piston of the brake actuator 2c is subjected.

The hydraulic pump 3 is driven by an electric motor 4, which in turn is actuated in a pulse-width-modulated manner (PWM) by the control unit 20. Upon activation of the electric motor 4, hydraulic pump 3 can, by suction of brake fluid at the suction side, build up a brake pressure on the high-pressure side. For an autonomous pressure build-up, switching valve 6 is opened and cut-off valve 15 is closed. The pressure in the wheel brakes 2a, 2b may be estimated on the basis of a pressure model or alternatively measured by means of pressure sensors (not shown). When the desired pressure, which is determined by the control unit for example on the basis of a determined vehicle inclination and/or on the basis of an estimated vehicle loading, prevails, the actuation of the electric motor is ended. By means of the closed cut-off valve 15 or a closure of the inlet valves 7a, 7b, the brake pressure is shut in, whereby the vehicle can be held for a time (which is limited by any leakage of the brake system).

A brake system suitable for carrying out the method according to the invention thus preferably has a hydraulic service brake at all of the wheels and an electric parking brake at some of the wheels. In particular, the hydraulic service brake has a diagonal division of the brake circuits, whereby for example the right front wheel and left rear wheel are actuated by means of one brake circuit, and an integrated parking brake at the rear wheels.

If the vehicle is secured against rolling away for example on a gradient by activation of the holding function and an autonomous pressure build-up in the service brake, and a predefined length of time elapses without onward travel, a transfer from the service brake to the electric parking brake takes place. A transfer may take place if one of the activation conditions of the respective holding function is no longer met, for example because the driver has released his belt and/or deactivated the ignition. This may self-evidently also be regarded as the fulfillment of a transfer condition.

During the transfer, the pressure in the hydraulic service brake is, according to the prior art, held at a determined pressure level while the electric parking brake is applied. Here, in the integrated parking brake, the force of the electric parking brake acts on the same brake-application element as the hydraulic service brake. The brake-application element is therefore moved closer to the brake disk, whereby the volume of the connected hydraulic brake cylinder increases. Said increase in volume causes a corresponding pressure drop in the brake circuit.

FIG. 2 shows a diagram of the pressure in a hydraulic brake circuit, wherein the ordinate indicates the pressure p and the abscissa indicates a relative time t. The vehicle is braked and the holding function, or active holding of the vehicle by the hydraulic service brake, is activated. Line 100 shows the profile of the pressure according to the prior art. Starting at the time $t_a$, the vehicle is braked, then starting at the time $t_b$, a gradient-dependent pressure $p_1$ (for example 40 bar) for holding the vehicle is set. At the time $t_1$, a transfer between the service brake and the electric parking brake takes place (for example because the driver opens the door). During the application of the electric parking brake, the volume of the brake circuit increases owing to the retroaction by the common brake-application element, whereby the hydraulic pressure decreases, and reaches a lower pressure level $p_2$ (for example 25 bar) at the time $t_2$. After the application of the integrated parking brake (or of the electric parking brake) has taken place, the hydraulic holding function is deactivated, and the brake pressure falls to approximately zero.

The hydraulic pressure $p_1$ set by the holding function is suitable for preventing the vehicle from rolling away on the present gradient, whereas the reduced pressure $p_2$ is often no longer sufficient for securely holding the vehicle. The application of the electric parking brake provides an additional braking action at the wheels of the rear axle, whereby the vehicle is further secured. Owing to the diagonal division of the brake circuits, the brake pressure likewise falls at the wheels of the front axle, whereupon a "settling" of the vehicle takes place. The slow pressure decrease in the front-wheel brakes leads to a partial release of the brake pads, and disturbing creaking noises occur owing to a relative movement between the brake disks and brake linings.

The duration of the pressure decrease is defined by the speed of application of the integrated parking brake, and can thus be changed only with high outlay in terms of construction. One possibility for preventing said "settling" of the vehicle consists in realizing the hydraulic holding function with a higher brake pressure. This disadvantageously decreases the speed of the release of the holding function, which would be perceived by a driver as a loss of comfort during a starting process on a hill.

Therefore, in the method according to the invention, the pressure decrease during the transfer is compensated by means of an additional autonomous pressure build-up in the hydraulic service brake, resulting in the pressure profile of line 101. The hydraulic holding pressure thus always remains at the value required for secure holding, and "settling" of the vehicle with creaking noises is prevented.

This is achieved, according to a first exemplary embodiment of the invention which is shown in the box in FIG. 2, by virtue of an additional pressure demand A being made as per line 102. Therefore, an additional pressure build-up takes place at a constant rate, which additional pressure build-up compensates the pressure decrease. The rate of the pressure build-up is preferably controlled by means of the pulse-width-modulated actuation of an electric motor of a hydraulic pump. Here, the gradient of the pressure build-up is expediently determined by the application behavior of the electric parking brake and by the hydraulic brake pressure at the time of the transfer.

According to a second exemplary embodiment, in order to yet further reduce remaining pressure fluctuations, the pressure build-up takes place at a first constant rate initially, and at a second constant rate after the expiry of a predefined period of time.

To reproduce as exactly as possible the pressure dissipation resulting from the increase in volume of the brake circuit during the application of the electric parking brake, the pressure build-up may also be demanded in accordance with any desired mathematical function or a table with value pairs.

It is advantageous for the holding function to be implemented by means of a brake system control unit which also provides slip regulation and driving dynamics regulation and which can output brake-application demands to an electric parking brake. It is also particularly preferable for status signals of the electric parking brake to be output to said control unit. The transfer may thus also be omitted or terminated if a malfunction of the electric parking brake occurs. By evaluation of the wheel rotational speed sensors of a slip regulator, the time $t_1$ at which an additional pressure demand must take place may also be identified without the presence of a pressure sensor.

By virtue of the fact that the pressure drop resulting from the increase in volume in the one or more brake circuits is compensated by means of the simultaneous autonomous build-up of hydraulic pressure, increased comfort in the use of a holding function is realized.

The invention claimed is:

1. A method in which a vehicle having a service brake and a parking brake is held by autonomous brake actuation, wherein in a first step, an actuation of the service brake is performed by a control unit of the vehicle, and in the event of a predefined condition being met, a transfer from the service brake to the parking brake is performed by the control unit, wherein during the transfer, both an actuation of the parking brake and also an additional actuation of the service brake take place, and wherein the additional actuation of the service brake takes place at least partially at the same time as the actuation of the parking brake.

2. The method as claimed in claim 1, wherein the additional actuation of the service brake is a further autonomous pressure build-up.

3. The method as claimed in claim 1, wherein the additional actuation of the service brake has a predefined profile with respect to time, which is set in accordance with a mathematical function or a predefined value table.

4. The method as claimed in claim 3, wherein the additional actuation of the service brake encompasses at least one time period in which the braking force increases at a constant rate.

5. The method as claimed in claim 4, wherein in a first time period, the braking force increases at a first rate, and in a second time period, the braking force increases at a second rate.

6. The method as claimed in claim 5, wherein at least one rate is selected as a function of at least one of the speed of actuation of the parking brake and the braking force acting before the transfer.

7. The method as claimed in claim 1, wherein the additional actuation of the braking force is performed such that, during the transfer from the service brake to the parking brake, the total braking force is held constant within a predefined degree of accuracy.

8. The method as claimed in claim 1, wherein during the transfer from the service brake to the parking brake, a check is performed as to whether at least one of the vehicle and one or more or all of the wheels remain at a standstill.

9. The method as claimed in claim 8, wherein the standstill check takes place with the aid of at least one wheel rotational speed sensor at a wheel braked only by the service brake, wherein the additional actuation of the service brake takes place when at least one signal flank of a wheel rotational speed sensor is detected.

10. The method as claimed in claim 1, wherein the predefined condition for the transfer from the service brake to the parking brake is met if at least one of i) a deactivation of the engine ignition, ii) a release of at least one safety belt, iii) an opening of at least one door, and iv) an expiry of a predefined time period is detected.

11. The method as claimed in claim 1, wherein the braking force of at least one of the service brake and the parking brake is selected as a function of at least one of a vehicle inclination and a loading state.

12. A brake system for a vehicle, having a service brake which permits a driver-independent brake actuation and having an electrically actuable parking brake, wherein said brake system has a control unit for carrying out a method in which a vehicle having a service brake and a parking brake is held by autonomous brake actuation, wherein in a first step, an actuation of the service brake is performed, and in the event of a predefined condition being met, a transfer from the service brake to the parking brake takes place, wherein during the transfer, both an actuation of the parking brake and also an additional actuation of the service brake take place, and wherein the additional actuation of the service brake takes place at least partially at the same time as the actuation of the parking brake.

13. The brake system as claimed in claim 12, wherein the parking brake and service brake at at least one wheel of the vehicle act on the same brake-application element or element(s), which is/are assigned to the at least one wheel.

14. The brake system as claimed in claim 12, wherein the service brake has at least one hydraulic brake circuit which comprises hydraulically actuated friction brakes at least two wheels of the vehicle, and at least one wheel of the vehicle can be braked only by the service brake.

15. The brake system as claimed in claim 14, wherein during the transfer from the service brake to the parking brake, an autonomous pressure build-up takes place in at least one hydraulic brake circuit of the service brake, said autonomous pressure build-up in particular being controlled and/or regulated such that the pressure in the at least one hydraulic brake circuit is held constant within a predefined degree of accuracy.

* * * * *